US010200351B2

(12) United States Patent
Gustavson et al.

(10) Patent No.: US 10,200,351 B2
(45) Date of Patent: Feb. 5, 2019

(54) SYSTEM FOR MANAGING REMOTE SOFTWARE APPLICATIONS

(71) Applicant: Google LLC, Mountain View, CA (US)

(72) Inventors: Erik Gustavson, Los Angeles, CA (US); Scott Kriz, Manhattan Beach, CA (US); Aaron Eisenberger, Santa Monica, CA (US); Garrett Brown, Costa Mesa, CA (US); Jason Carulli, Dana Point, CA (US); Andrew Arrow, Culver City, CA (US); Prashant Nadarajan, Singapore (SG); Fong Woh Fai, Kuala Lumpur (MY); Chung Weng Wai, Kuala Lumpur (MY); Saw Kee Wooi, Kuala Lumpur (MY)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/097,120

(22) Filed: Dec. 4, 2013

(65) Prior Publication Data

US 2014/0282971 A1   Sep. 18, 2014

Related U.S. Application Data

(60) Provisional application No. 61/782,519, filed on Mar. 14, 2013.

(51) Int. Cl.
*H04L 29/06* (2006.01)
*H04L 29/08* (2006.01)

(52) U.S. Cl.
CPC .......... *H04L 63/08* (2013.01); *H04L 63/0815* (2013.01); *H04L 63/168* (2013.01); *H04L 67/10* (2013.01)

(58) Field of Classification Search
CPC ..... G06F 21/41; H04L 63/0815; H04L 63/08; H04L 63/168; H04L 67/10; H04L 9/0863; H04L 9/3213; H04L 29/06
USPC .......................................... 726/1–8; 713/161
See application file for complete search history.

(56) References Cited

U.S. PATENT DOCUMENTS

| 8,856,869 B1* | 10/2014 | Brinskelle ............... H04L 63/08 726/12 |
| 2005/0240671 A1* | 10/2005 | Beyer et al. .................. 709/227 |
| 2007/0174193 A1* | 7/2007 | Quan ...................... G06F 21/41 705/44 |
| 2011/0277027 A1 | 11/2011 | Hayton et al. |
| 2012/0054625 A1 | 3/2012 | Pugh et al. |
| 2013/0086670 A1* | 4/2013 | Vangpat ................ H04L 9/3213 726/8 |

(Continued)

OTHER PUBLICATIONS

International Preliminary Report on Patentability issued in International Application No. PCT/US2014/020426, dated Sep. 15, 2015, 10 pages.

(Continued)

*Primary Examiner* — Ashok Patel
*Assistant Examiner* — Quazi Farooqui
(74) *Attorney, Agent, or Firm* — Fish & Richardson P.C.

(57) ABSTRACT

The disclosure describes systems, methods and devices relating to a sign-on and management hub or service for users of multiple internal, external or Software-as-a-Service (SaaS) software applications (Apps), with options for centralized management and sharing of accounts without needing to provide login credentials to individual users.

30 Claims, 4 Drawing Sheets

(56) References Cited

U.S. PATENT DOCUMENTS

2013/0166918 A1* 6/2013 Shahbazi .............. H04L 9/0863
    713/183
2013/0304797 A1* 11/2013 Warren et al. ................ 709/203

OTHER PUBLICATIONS

International Search Report and Written Opinion issued in International Application No. PCT/US2014/020426, dated Sep. 18, 2014, 6 pages.

Murukutla et al. "Single Sign on for Cloud," IEEE International Conference on Computer Sciences, Sep. 14, 2012, 4 pages.

Revar et al. "Securing user authentication using single sign-on in Cloud Computing," IEEE International Conference on Engineering (NUICONE), Dec. 2011, 4 pages.

* cited by examiner

SYSTEM FOR MANAGING REMOTE SOFTWARE APPLICATIONS

This application claims priority to U.S. Provisional Patent No. 61/782,519, to Gustayson et al., filed on Mar. 14, 2013, and entitled "SYSTEM FOR MANAGING REMOTE SOFTWARE APPLICATIONS."

BACKGROUND OF THE INVENTION

Field of the Invention

The invention relates generally to methods and systems for managing remote software applications. Specifically providing a unified login experience to applications and management of application login credentials.

Description of the Related Art

Software-as-a-Service (SaaS) is a method for software deployment or delivery using the Internet, internal corporate network or similar networks. This software is generally centrally hosted, either by a service provider or by an organization. Under SaaS, a software provider licenses a software application (App) to clients for use on demand. Basic access to an App might be free of charge or with a fee. SaaS allows the provider to develop, host and operate a software application, for use by clients, who use a computer or smart device with internet access to download, if required, and run the software application and/or to access a host via a web browser or similar thin-client to run the software application. The App can be licensed to single user (one-user, one-account) or a group of users or an organization, and each user account may have many clients and/or client sessions (shared account). Some current examples of Apps include Amazon Web Services, Google Apps, Salesforce.com, Concur Travel & Expense, and Twitter.

As popularity of the SaaS model has grown, modern organizations and employees, such as individual knowledge workers, rely on an increasing number of services and Apps. Each App is typically secured with its own username and password combination, requiring users and/or organizations to keep track of the many combinations. These passwords are frequently stored insecurely, often scribbled on Post-It notes on monitors, or held in shared spreadsheets.

It is also common in some Apps to have one account that is shared by multiple users. For example, an organization will typically have one Twitter account, which will be updated and managed by many staff members. To access the account, each staff member will need to be given the username and password. This creates security concerns when a staff member leaves the organization, at which point the organization wishes to revoke the ex-member's access. This often necessitates creating a new password, which then must be redistributed to all active staff members (who then typically update their Post-It notes). The shared account and password model also complicates the use of contractors or consultants, for concerns over sharing passwords with temporary team members or outside organizations, and subsequent access revocation and password resetting.

Managing Apps with the one-user one-account model is also complicated for organizations, requiring significant time from IT administrators to setup accounts for large departments or organizations when a new App is rolled out to the organization. On-going maintenance is also challenging, as administrators try to keep, add or remove App accounts when members join and leave the organization.

Additionally, organizations typically have little to no information about which members access which Apps or when. This prevents the organizations from having traceable audit trails, required by many licensing bodies.

Existing Apps typically provide services in a one-to-one relationship with the end user, a relationship with the end user's systems and/or with the end user's organization. Integration between an end user's systems and Apps or between an end user's Apps requires pre-arranged coordination and configuration by all parties. Additionally, the Apps are not aware of each other and have no mechanism to communicate or coordinate without the participation and pre-arranged coordination of the end user and/or the end user's organization.

For example, an organization might store data in a remote spreadsheet service (for example, "Google Docs" or "Windows 365") and want to import that data into a customer relationship management (CRM) service or marketing automation service (for example, Salesforce.com or Marketo.com, respectively). Presently, each of the mentioned services would require direct integration effort to work together, potentially involving four distinct integrations as follows: (i) Google Docs to Marketo, (ii) Google Docs to Salesforce.com, (iii) Windows 365 to Marketo, (iv) Windows 365 to Salesforce.com. The problem grows as more Apps require integration with each other and when multiple Apps simultaneously require integration with each other.

A further example would be moving press release content from a content management system (CMS) (for example, wordpress.com, squarespace.com, or tumblr.com) and sending that data to a social media service or social media management service (examples: twitter.com, facebook.com, Google+, hootsuite.com, cotweet.com, buddymedia.com). The listed examples would involve 18 different integration points—the number of integrations rises exponentially with the number of integrated applications. Solutions are desirable to streamline these operations and the others described above.

SUMMARY OF THE INVENTION

The disclosure describes methods and systems relating to the access of externally hosted applications, such as software as a service (SaaS) applications (Apps), via a service accessed from a single user interface or portal. This service may provide a unified login experience to a number of external applications, such that the credentials required to access the external applications do not need to be known to the user. Embodiments of this service can provide a set of features, such as authentication, authorization, audit, delegated credentials, messaging, storage, data access, and alerts (Core Services), such that a set of services or Apps may be available to be interacted with, to an end user; an organization that the user is a member of; or other Apps to provide coordinated functionality to the user and organization without requiring pre-arranged integration between the Apps. This set of Core Services, individually or in combination, can allow one or more Apps to provide functionality beyond what is available from an individual App operating in a one-to-one relationship with the end user or end user's organization.

In some configurations, the systems and methods may allow for users to access the external applications by having access and credentials to the service itself and not the external applications. The systems and methods may allow multiple users access to external applications and shared pages without having to share the login credentials, such as a password. Users may also be able to view messages and alerts from all external applications in a consolidated alert or message box. Users and administrators may also be able to request or grant access to external applications without sharing credentials and create/modify/delete users and user access to applications individually or via a bulk process. These features and functions are discussed in more detail below.

In some configurations according to the present disclosure a method providing sign-on to applications may be provided. The method may comprise accepting a user login from a user to a system and accepting an application access request for at least one application. The method may also include providing an authenticated session to the application.

Other configurations provide a single sign-on system operable on a server, accessible by a network. The system comprises a server component for allowing single sign-on to multiple applications, the server component capable of storing user information, application login credentials and user application permission information. The server also includes a client interface which interacts with the server component, the client interface capable of receiving user information and requests for user access to at least an application. Furthermore, the server component is capable of creating an authenticated session to the application and providing the session to a user.

Yet other configurations include a computer program product, comprising a non-transitory computer-readable medium. The computer program product comprises code for accepting a user login from a user to a system and code for accepting an application access request for an at least one application. The computer program product may also include code for providing an authenticated session to the application.

A better understanding of the features and advantages of the present embodiments will be obtained by reference to the following detailed description of the invention and accompanying drawings, which set forth illustrative embodiments in which the principles of the invention are utilized.

BRIEF DESCRIPTION OF THE DRAWINGS

The accompanying drawings are included to provide a further understanding of the present invention, and are incorporated in and constitute a part of this specification.

DETAILED DESCRIPTION OF THE INVENTION

Figure 1:
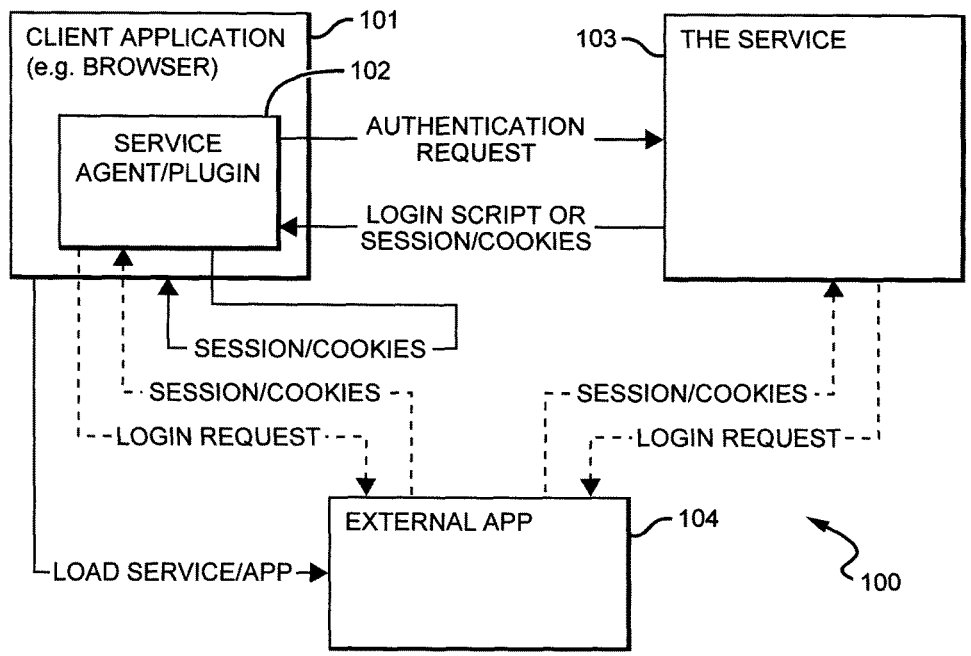
FIG. 1 illustrates an exemplary system for allowing sign-on for multiple applications according to one embodiment of the present disclosure.

In the description that follows, numerous details are set forth in order to provide a thorough understanding of the invention. It will be appreciated by those skilled in the art that variations of these specific details are possible while still achieving the results of the invention. Well-known elements and processing steps are generally not described in detail in order to avoid unnecessarily obscuring the description of the invention.

Embodiments of the invention are described herein with reference to illustrations that are schematic illustrations of embodiments of the invention. As such, the actual size, components and features can be different, and variations from the components of the illustrations as a result, for example, of manufacturing techniques and/or tolerances and system configurations are expected. Embodiments of the invention should not be construed as limited to the particular components illustrated herein, but are to include deviations in system architecture and improvements. The regions, sections and components illustrated in the figures are schematic in nature and their devices and shapes are not intended to illustrate the precise shape of a feature of a device or device itself and are not intended to limit the scope of the invention. Furthermore, components described as being connected or connections may not be direct. Intervening components or connections may exist. Also, components may be shown as one unit, but may instead be a collection of components or units.

In the drawings accompanying the description that follows, reference numerals and legends (labels, text descriptions) may be used to identify elements. If legends are provided, they are intended merely as an aid to the reader, and should not in any way be interpreted as limiting.

As the use of software as a service (SaaS) applications becomes more widely used by individuals and organizations alike, it is desirable to streamline and improve the use of these applications. The present disclosure discusses systems and methods to do so, including, for example, providing a single sign-on experience to a user for multiple applications, managing the users and user access to multiple applications whether one or many users use the same application, and notifying users of messages and alerts from these applications on a unified screen.

FIG. 1 illustrates one configuration of a system according to the present disclosure for allowing sign-on for multiple applications. In some configurations, this sign-on may function to an end user as a single sign-on to multiple applications. Also, the sign-on process may be transparent to the end user, occurring in the background or unnoticed by a user. The applications accessed may be traditional applications, remotely hosted applications, or applications referred to as software as a service (SaaS) applications. The system over which communication is held may be any network, such as an Internet or private network connected system that includes a client-side UI and/or component, and various server-side components. A user can utilize this system by accessing an interface to allow single sign-on to multiple external SaaS applications ("external Apps"). The system may be accessed via an internet-based, browser-based or app-based interface.

In this configuration of the system, the service 103 manages the user sign-on process, such that a user signs in the service and then proceeds to access the applications available to the user through an interface of the service. More specifically, by signing into the service 103, the user is able to create authenticated sessions with all pre-configured external Apps without having to supply credentials (e.g., username and password) for the external App. The user does not need to know and may never have even seen the password or other credentials for the account they're logging into in the external App.

The system generally incorporates three components, a client side component 101, a server side component 103, and access to third-party external applications 104. In FIG. 1, the process starts in the top left, with a user accessing the Client Application 101, using it to sign onto the service 103. The client application 101 may be hosted in the same location as the server side component 103 or elsewhere. The client application 101 allows the user to view the available external Apps that the user may access. These Apps include those that the user and/or an administrator have previously configured for the user to access. The user selects the external App that the user wishes to use, and this selection initiates a request to the server side component, the service 103. This request may be initiated directly or in other embodiments it may be initiated through a service agent/plugin 102, if installed (if not installed, the user is guided through installation). Though the term "plugin" is used here, in other embodiments this function might be performed by any other component on the user or client side, such as directly by the browser, extensions, software agents, add-ons, snap-ins, scriptlets, a stand-alone application or similar technologies.

A request then passes from the client application 101, or plugin 102, to the server side component or service 103, where various operations and checks are performed, and the previously stored login credentials for the user for the desired external App are retrieved. Thereby, removing any need for the user to directly provide credentials to initiate an authenticated session with the external App 104.

Most external Apps 104 utilize session authentication methods that can be initiated via server-to-server ("server-side") logins, e.g. passing the user credentials directly from the service 103 to the external App systems 104, and receiving useable session credentials in return. However, some external Apps 104 employ additional levels of security in their session credentials, such as the IP address from which the session was initiated, which in turn requires that the login procedure be conducted from the client. If the external App 104 allows server-side logins, a login request is sent from the service 103, passing the user's login credentials to the external App's servers 104. The external App 104 replies with information, which the service 103 sends back to the client 101 or plugin 102. This information, which may be a session credential, session/cookie or other necessary information to conduct an authenticated session in the external App, might be a set of standard HTTP cookies. In other embodiments of the invention, this information could be a session GUID or similar token, or any other manner of tracking identifiers typically transferred between systems to indicate an authenticated session.

If the external App 104 does not allow server-side logins, the service 103 passes an encrypted or digitally signed script, including the user's login credentials, back to the client 101 or plugin 102. The client 101 or plugin 102 then issues a login request to the external App 104, and captures the session information response.

In both cases, the plugin 102, when used, then passes the session information to the client application 101, and the user, via the client application 101, is forwarded to their desired external App 104, where the user arrives already logged in, without being required to enter login information or credentials (for example, username and password) to start their authenticated session. In other embodiments, the user or administrator may have the option of allowing the user to directly login to selected or all Apps by providing a username and password, rather than having the system handle the login process.

Figure 2:
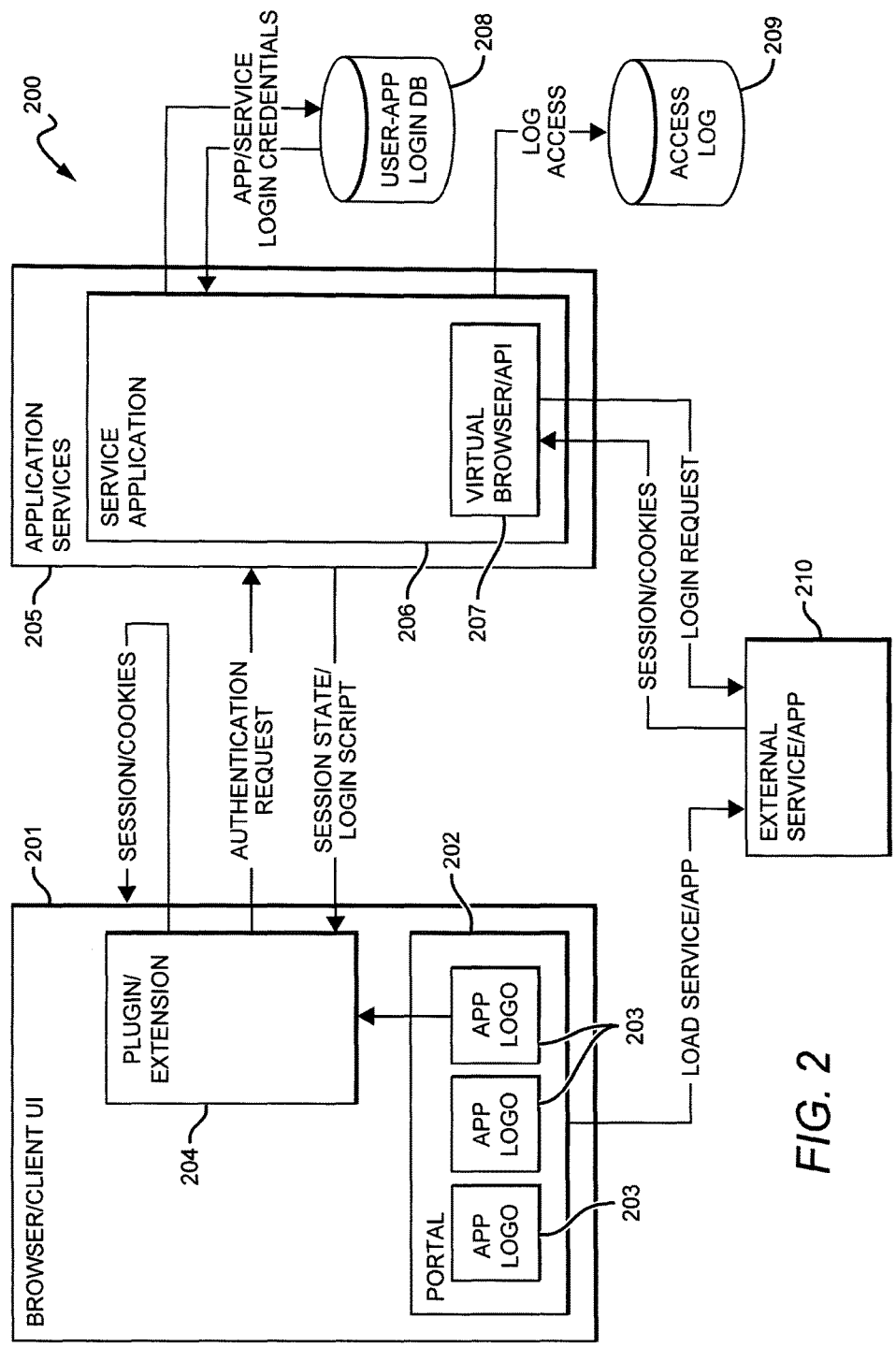
FIG. 2 illustrates another embodiment of a system for allowing sign-on for multiple software as a service (SaaS) applications according to one embodiment of the present disclosure.

FIG. 2 is a more detailed illustration of another embodiment of a system 200 for allowing sign-on for multiple software as a service (SaaS) applications in accordance with the present disclosure. The system 200 is an Internet or private network connected system that includes a client-side UI and/or component, and various server-side components. Server side components may include an intelligent external App API layer, User-App Credentials and Logging databases. Additional components may also be incorporated. A user will utilize this system by accessing the Internet-based or app-based interface as a single sign-in portal via a public or private network, such as the Internet or corporate network.

Starting from the top left of FIG. 2, a user interface 201 to the system or service 205 is provided as an Internet or private network-based front-end portal 202. The portal may be hosted remotely or locally. The primary component of the portal 202 includes a dashboard that acts as a container for all other user interface elements or widgets 203 for initiated functions of the system 205. In other embodiments of the invention, this front-end portal could be replaced with an application or "app". The widgets 203 are graphical elements that represent links to external applications (Apps) 210 that the user of the system has selected or that have been selected for the user by an administrator from the user's organization. Additionally, the widgets 203 also contain links and/or shortcuts to other functions of the system 205 available through the portal 202. In other configurations, the system 205 may include additional functionality that is exposed through the portal 202 such as enhanced chat features. These enhanced chat features may offer standard inter-user and group messaging, but may also offer the ability to share App access, synchronize App views, and in other embodiments may allow a wide range of real-time commands to be executed on the client to expand functionality of the portal 202 or the external Apps 210.

In some embodiments, the graphic elements or widgets 203 are not confined to a stationary location, but can be moved and re-ordered within the dashboard of the portal 202 by the user of the system 205. To this end, the dashboard of the portal 202 is dynamic in nature, and can be customized.

As seen in FIG. 2, the single sign-on function starts when a user requests a session with the external application (App) of their choosing from those available in their dashboard 202, by selecting (clicking, tapping, etc.) on the corresponding widget/logo 203. A "session" herein indicates any interaction between the user and a service or application. An "authenticated session" indicates an interaction wherein the identity of the user has been asserted and, in some configurations, verified.

This selection initiates a request to the plugin 204, if installed (if not installed, in some embodiments the user is prompted to install the plugin). The term "plugin" is used here, but in other embodiments of the invention this function might be performed by any other component such as extensions, software agents, add-ons, snap-ins, scriptlets, or similar technologies.

A request then passes from the plugin 204 to the services 206, where a database, such as the User-App Login DB 208, is checked, and corresponding login credentials for the user are retrieved. The User-App Login DB 208 may be hosted as part of the services 206, or may be an externally-hosted database or similar system. These login credentials might be, for example, username and password, a PIN, a public key or certificate, biometric information, or any other type of authentication information.

In some embodiments, all external connections to and from the system 205 are performed over a network, such as the public Internet or private networks.

If the external App 210 allows server-side logins, a login request is sent from the services 206, passing the user's login credentials to the external App's servers 210. This login request may occur via submitting the external App's 210 login from inside a virtual browser 207, or other user client emulator, or via an API, if available. The external App 210 replies with session/cookie information, which the services 206 send back to plugin 204. This session/cookie information might be standard HTTP cookies, or in other embodiments of the invention, it could be a session GUID or similar token, or any other manner of tracking identifiers typically transferred between systems to indicate an authenticated session. The service 206 logs this access in the Access Log database 209 for later auditing.

If the external App 210 does not allow server-side logins, the services 206 pass an encrypted script, including the user's login credentials, back to the plugin 204. The plugin 204 then issues a login request to the external App 210, and captures the session/cookie information response.

In both cases, the plugin 204 then passes the session/cookie information to the user's browser 201, and the user's browser 201 is forwarded to their desired App 210, where the user arrives already logged in, without being required to enter login information to start their session. The plugin 204 can also log this access in the Access Log database 209 via the services 205, for later auditing.

In some configurations, the system 205 includes a secondary auditing function which may be very beneficial to the user of the service with respect to business compliance and governance. The data contained within this Access Log database 209 can be queried and reported in various formats. This data can be used to create reports for testing evidence for audits such as SOX, GLB, PCI, HIPAA, and other industry-specific data and information security compliance regulations. Such data can also be used to produce activity reports for a single user or a group of users across all managed and monitored SaaS applications.

Figure 3:
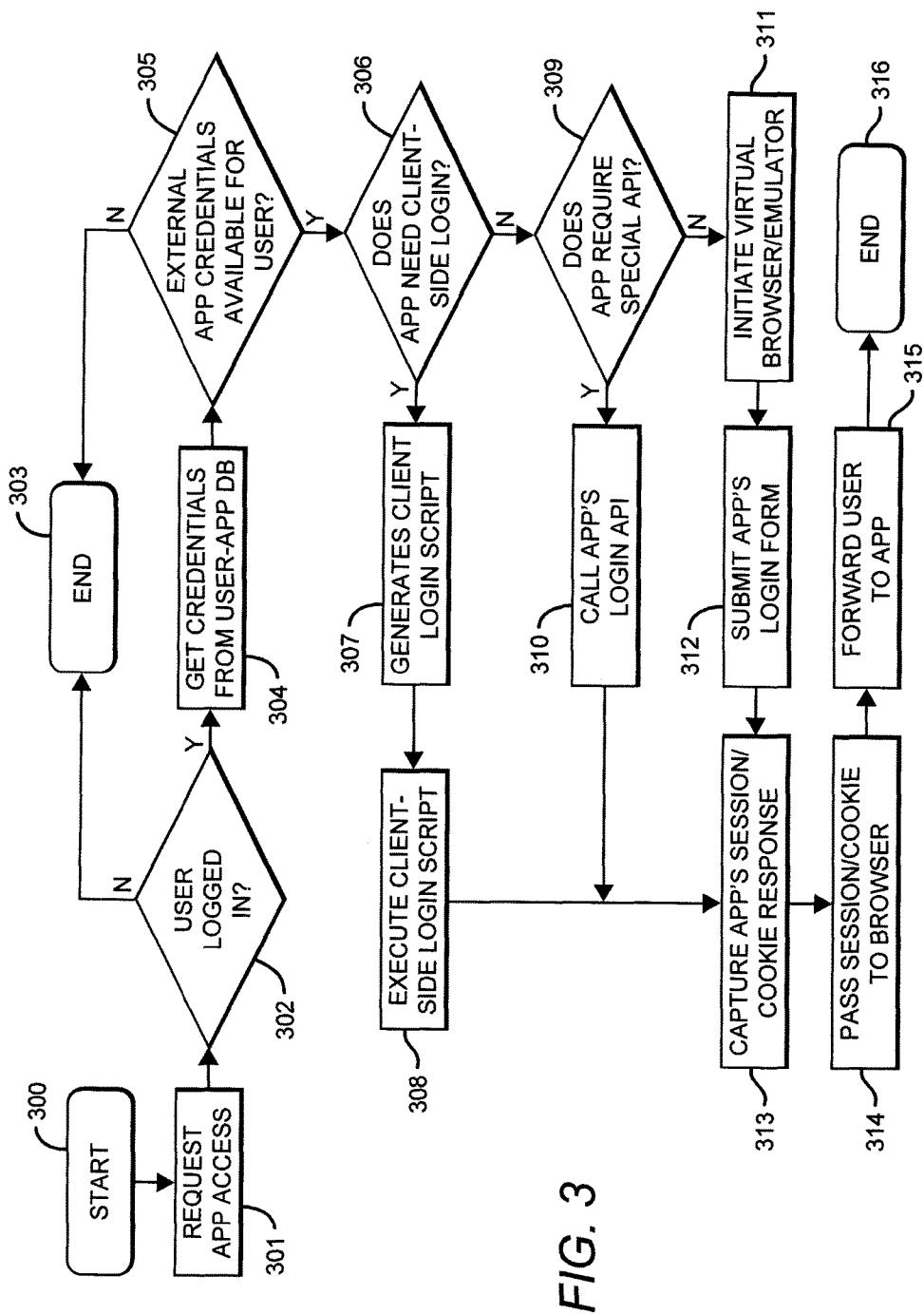
FIG. 3 illustrates a flowchart for performing a method of sign-on for multiple software as a service (SaaS) applications according to one embodiment of the present disclosure.

FIG. 3 illustrates a flowchart for performing a method of sign-on for multiple software as a service (SaaS) applications in accordance with an embodiment of the invention. This drawing is a walk-through of embodiments of systems according to the present disclosure such as the system described in FIG. 2.

As seen in FIG. 3, the single sign-on function starts at step 300 when a user requests a session with the external application (App) of their choosing. This request may be initiated by choosing from the Apps available in their dashboard 202, by clicking on the corresponding widget/logo 203. At step 301, this request is then passed from the user's browser, optionally through the plugin 204, and on to the service 205.

In step 302, the request is received by the service 205, where the service 205 verifies that the user is validly signed in to the service 205. If not, this request process ends at step 303, where the user is asked to sign in to the service 205. If the user is properly signed in to the service 205, the user's sign-in credentials with the desired App are retrieved from a database, such as the User-App DB 208, in step 304. If no valid credentials are found for the user for the desired external App 210 in the User-App DB 208, this request process ends at step 303, where the user is alerted to the missing/invalid credentials.

If valid sign-in credentials are found in step 304, or, in some embodiments, in steps 304 and 305, the service 205 next determines if the external App 210 requires client-side login, in step 306.

If in step 306 it is determined the external App 210 requires client-side login, a login script is generated by the services 205 in step 307. In some configurations it may be desirable to have sensitive data in the script encrypted, and the entire script cryptographically signed, to detect and prevent tampering. This script is then returned to the plugin 204, where the script is executed, via a connection to the external App 210, in step 308.

If in step 306 it is determined that the external App 210 does not require a client-side login, in step 309 the services 205 next evaluate if the App requires a special API to execute the login. This evaluation may take place using any method which would allow the system to recognize whether an API is required, or the requirement may be saved or designated by the service such that an evaluation is not required at each access. In some configurations, this evaluation is based on a hierarchy of access methods. For example, if a standards-based SSO API, such as but not limited to SAML or OpenID, is available from external App 210, it is utilized. The system 205 may elect to use a configured access token (for example, API key or OAuth) in requests not involving authentication. If the external App does require a special API call, in step 310 the service constructs and executes the required API call.

If in step 309 it is determined that no special API is required, in step 311 a "virtual browser" or other similar emulator is started by the service 205. In step 312, the virtual browser loads the external App's login form, supplies the user's credentials, and submits the form.

Successful execution of steps 308, 310, and 312 all lead to step 313, where the session/cookie response of the external App 210 to the various potential methods of login requests is captured, and transmitted to the plugin 204, or directly to the user if a plugin is not in use, if not already there.

In step 314, the plugin 204 passes the session/cookie information to the user's browser 201, and in step 315 the browser is forwarded to the desired App's URL. The process ends at step 316, as the user arrives at the external App 210 as a logged in user, without being required to enter login information to start their session.

Figure 4:
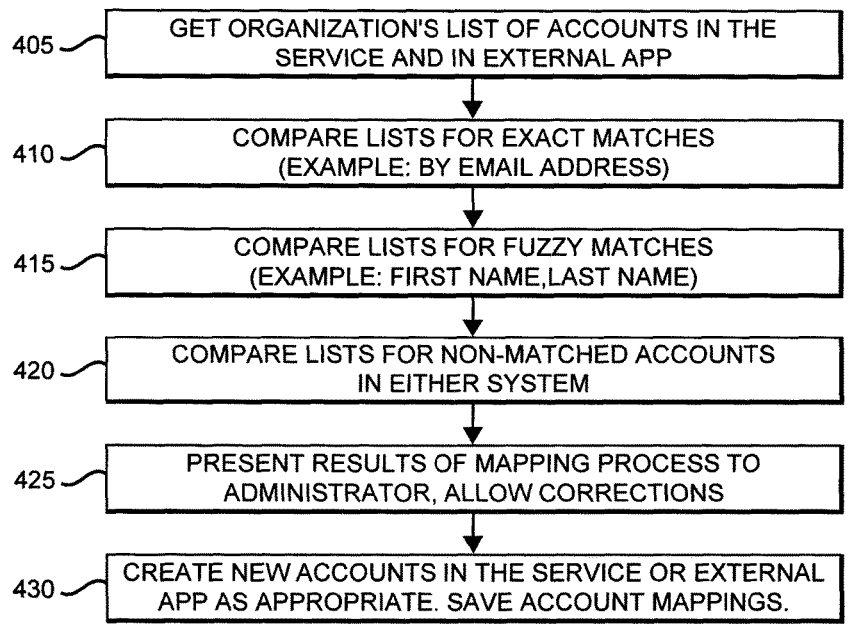
FIG. 4 illustrates a process for managing user accounts en masse according to one embodiment of the present disclosure.

As described previously, it can also be desirable to be able to manage user accounts for various Apps through the service. Such a process may allow an administrator or user to detect existing users and associated accounts and map them to each other to give users access to these accounts. The process may also allow for deleting, clearing, and quick management of other accounts and account access. The process may also allow for quick bulk creation of new/existing user access to new/existing Apps. FIG. 4 illustrates one configuration of a process according to one embodiment of the present disclosure for creating user accounts en masse in the service 205 or an external App 210, such that users can then access these user accounts from their client application, based on existing user accounts in either. This process may be useful in organizations with many users, using many Apps, saving Administrators and users time when starting to use the service, or when rolling out new external Apps to the organization. By starting with the list of users already existing in one (or multiple) systems, accounts can quickly be created for all required users in any new Apps. This process may also be useful in identifying accounts that should be removed or disabled from one or more of the systems.

In step 405, the lists of user accounts, along with basic account information (examples: email address, first name, last name) for the organization are gathered from the service and from the external App. The external App referenced here might be an SaaS system, an LDAP service or similar directory system containing accounts for some or all members of the organization. This process may be automated, via APIs, or the administrator may supply a text file with the account information. The basic account information may be for members of the organization or third parties that the organization may want to provide access or accounts for to the system.

In step 410, the lists are compared, searching for exact matches of the information fields provided (for example, based on email address associated with the user account).

In step 415, the lists are compared, searching for "fuzzy" or near matches of the information fields being compared (for example, based on first and last name associated with the user account). In some configurations, steps 410 and 415 may be combined, whereas in other configurations only one or both of the steps may exist.

In step 420, the lists are compared, to find accounts in either system that were not matched in steps 410 or 415.

In step 425, the results of the mapping process (steps 410-420) are presented to the user/Administrator, who is allowed to make corrections (for example: adding, removing or modifying account mappings, or excluding new accounts from being created). In some configurations, this step may be omitted proceeding directly to step 430.

In step 430, accounts are created/removed/modified in the service 205 or the external App 210 as needed. The creation/removal/modification of accounts may be completely automated, via, for example, APIs, or may enlist user involvement. After the accounts have been created/removed/modified, all account mappings are saved in the User-App Login DB 208. These saved account mappings are later used to associate the user account in the service 205 with the corresponding account in the external App(s) 210, and are referenced, for example, when a user requests a session with an external App 210, or when the service needs to check an external App 210 for new messages for the user.

Figure 5:
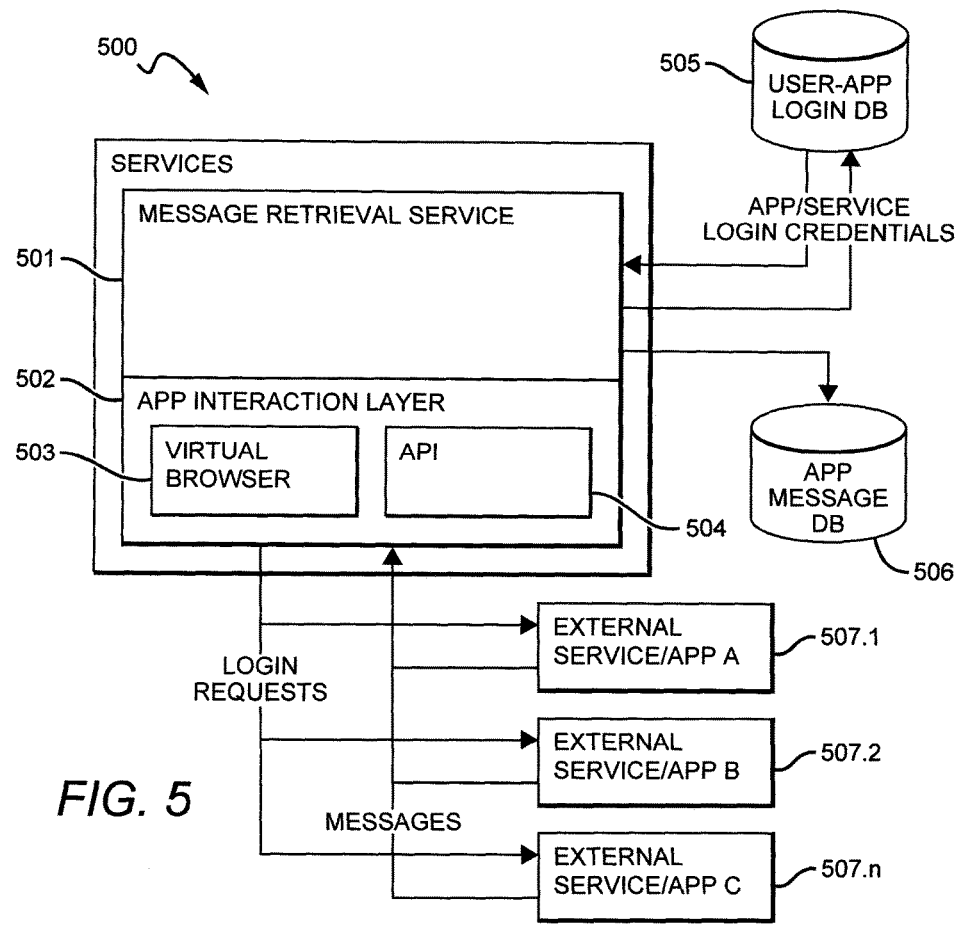
FIG. 5 illustrates a system for creating an integrated message inbox for a user of multiple external services according to one embodiment of the present disclosure.

In some configurations, the service may provide users with a streamlined view of messages, alerts, or notifications from all or a subset of the Apps they can access through the service. FIG. 5 illustrates a system 500 for creating an integrated message inbox for a user of multiple external services, in accordance with an embodiment of the invention. The "messages" might be e-mail-like correspondence, system status updates or alerts, social media updates, or any other type of message that might be generated by the external Apps 210. This system aggregates the messages generated by the various external Apps 210 for the user in one central repository. In other configurations, the messages or alerts may be placed in any number of separate inboxes rather a single inbox. This central repository may also contain system alerts and e-mail-like correspondence from the service 205.

The integrated message box system flow starts when the Message Retrieval Service 501 executes. This process may start automatically (scheduled, periodic, etc.), or on user (for example, end user or administrator) request.

The Message Retrieval Service 501 may execute for all users, a group of users, or a single user listed in a database, such as the User-App Login DB 505. The Message Retrieval Service iterates over the following process for all or a subset of the external Apps 210 associated with the user accounts for which it is attempting to retrieve messages:

The Message Retrieval Service 501 retrieves the necessary Login Credentials for the account(s) for which it will be retrieving messages from the User-App Login DB 505. It then passes a request to the App Interaction Layer 502, where the system decides the appropriate method for connecting to the external App 507.$n$ in question. The App Interaction Layer may connect to the external App 507.$n$ via a Virtual Browser 503, via an API 504, or any other appropriate connection method.

In either case, the user account's login credentials are sent to the external App 507.$n$, and any new messages for the user are requested.

Any new messages received from the external App 507.$n$ are saved into the App Message DB 506, and will be available for the user when they access the portal 202. In some configurations, while the user is using the portal 202, these messages may also be updated in real time through use of available real time update techniques or technologies (for example, web sockets, long-polling or other persistent or semi-persistent network connections). In yet other configurations, these techniques may also be used to update, in real time, areas of the interface unrelated to messaging, such as the list of available Apps.

Figure 6:
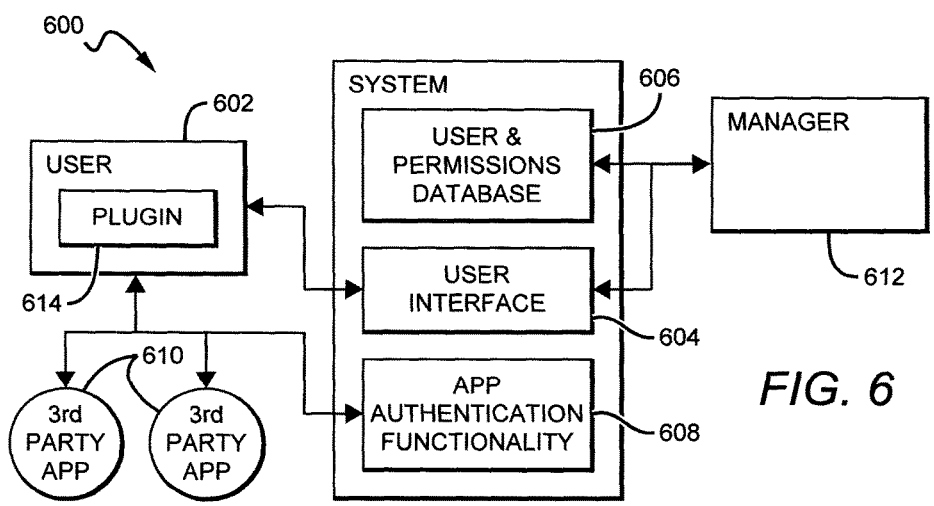
FIG. 6 illustrates another representation of an exemplary system for providing single sign-on to multiple applications according to one embodiment of the present disclosure.

FIG. 6 depicts an illustration of a system which provides single sign-on to an application. The system 600 incorporates a user interface 604, a user and permissions database 606, and the functionality which allows the creation of application authentication 608. As described previously, a manager, company, or managing user 612 may access the system 600 and provide settings or information to provide access to users 602 for applications 610. The user 602 may be a member or employee of the company the manager 612 belongs to or an outside party or other system user that has been authorized access to an app 610 by a manager or other person 612 authorized to provide access or access credentials.

A manager 612 may access the system 600 via a user interface 604. From the user interface 604 the manager 612 may enter credentials for access to 3rd party applications 610 into the user and permissions database 606. These credentials may be for the manager 612 themselves or for other system users 602. These may be existing users or newly created users. The manager 612 may also manage and maintain lists of users 602 and access permissions.

A user 602 may access the system 600 via a user interface 604, using a single log on to the system. Once logged into the system 600 a user 602 would be presented with an interface which displays a listing of $3^{rd}$ party applications or apps that the user may access. The listing may be of applications that the user already has been given permissions to, without further input of log in credentials, but may also include other applications the user may access if the user can provide access credentials.

After a user chooses an application 610 to access, the system 600 determines whether the user has access to the chosen application. Next the system 600 executes the appropriate app authentication process 608 and passes the authenticated session to the user 602. As described previously, this authentication may be done server to server between the system 600 and the $3^{rd}$ party app 610, such that the session is then passed to the user 602, or the information may be passed to a plugin 614 on the user's system 602, such that encrypted information may be passed to the plugin 614 from the system 600 to create or initiate the authenticated session for the app 610, without the user ever inputting or having known the log in credentials for the app 610. Thereby, the user can access several 3$^{rd}$ party apps by logging in to the system with a single log in and not providing any further log in credentials.

While the foregoing written description of the invention enables one of ordinary skill to create and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method comprising:
   obtaining, at a server of a sign-on system and from a client device, login credentials of a particular user for the sign-on system;
   obtaining, at the server of the sign-on system and from the client device, a request to access a particular third party application;
   identifying, by the server of the sign-on system, login credentials for the particular third party application from among a set of multiple stored login credentials based at least on both the login credentials of the particular user obtained for the sign-on system and the particular third party application that was requested; and
   triggering the client device to establish an authenticated session with the particular third party application requested using the login credentials for the particular third party application without providing the particular user access to the login credentials for the particular third party application, wherein the triggering includes:
      determining whether the particular third party application does not permit the server to provide the login credentials for the particular third party application that are identified by the server and instead requires the client device to provide login credentials; and
      providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device.

2. The method of claim 1, further comprising determining whether the particular user has access rights to the particular third party application.

3. The method of claim 2, wherein said login credentials for the particular third party application are provided to said system by a participant other than the particular user.

4. The method of claim 1, further comprising initiating an authenticated session by the server.

5. The method of claim 1, further comprising initiating the authenticated session from a client side component on the client device.

6. The method of claim 1, further comprising determining whether the particular third party application requires an API and executing the API.

7. The method of claim 1, further comprising determining whether the particular third party application requires an emulator and creating the authenticated session via the emulator.

8. The method of claim 1, further comprising managing a plurality of users and user access to a plurality of third party applications.

9. The method of claim 8, in which managing further comprises comparing user information for the plurality of users to a list of user account information.

10. The method of claim 9, in which managing further comprises identifying matches between the user information and the list, and mapping the matched information together.

11. The method of claim 9, in which managing further comprises identifying unmatched user information or items of the list.

12. The method of claim 9, in which managing further includes allowing creation, removal, and/or modifications of the plurality of users or account information.

13. The method of claim 1, further comprising providing the user with a combined view of messages such that the messages originate from at least one of the third party applications.

14. The method of claim 1, wherein
   providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device, comprises:
   in response to determining that the particular third party application does not permit the server to provide the login credentials for the particular third party application that are identified by the server and instead requires the client device to provide login credentials that are identified by the server, providing to the client device a client login script that includes the login credentials for the particular third party application, wherein receipt of the client login script by the client device causes the client device to execute the client login script and establish the authenticated session with the particular third party application without further input from the particular user after the request to access a particular third party application is obtained by the server.

15. The method of claim 1, wherein
   providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device, comprises:
   in response to determining that the particular third party application permits the server to provide the login credentials for the particular third party application that are identified by the server and does not require the client device to provide login credentials that are identified by the server:
  loading a login form of the particular third party application in a virtual web browser;
  supplying the login credentials for the particular third party application into the login form loaded by the virtual web browser;
  submitting, by the virtual web browser, the login form of the particular third party application with the login credentials for the particular third party application supplied in the login form; and
  in response to submitting the login form of the particular third party application with login credentials for the particular third party application supplied in the login form, obtaining session information for an authenticated session between the virtual web browser and the particular third party application; and
  providing the session information for the authenticated session between the virtual web browser and the third party application to the client device for the client device to use to establish the authenticated session with the particular third party application.

16. The method of claim 15, wherein the session information comprises a web browser cookie.

17. The method of claim 15, comprising:
determining whether the third party application requires login through a specific application programming interface,
wherein loading the login form of the particular third party application in the virtual web browser is in response to determining that the third party application does not require login through a specific application programming interface.

18. The method of claim 1, comprising:
in response to obtaining, at the server of the sign-on system and from the client device, the request to access the particular third party application, determining whether a user is signed on the client device; and
in response to determining that a user is not signed on the client device, triggering the client device to provide a prompt for a user to provide login credentials for the sign-on system.

19. A system comprising:
one or more computers and one or more storage devices storing instructions that are operable, when executed by the one or more computers, to cause the one or more computers to perform operations comprising:
obtaining, at a server of a sign-on system and from a client device, login credentials of a particular user for the sign-on system;
obtaining, at the server of the sign-on system and from the client device, a request to access a particular third party application;
identifying, by the server of the sign-on system, login credentials for the particular third party application from among a set of multiple stored login credentials based at least on both the login credentials of the particular user obtained for the sign-on system and the particular third party application that was requested; and
triggering the client device to establish an authenticated session with the particular third party application requested using the login credentials for the particular third party application without providing the particular user access to the login credentials for the particular third party application, wherein the triggering includes:
  determining whether the particular third party application does not permit the server to provide the login credentials for the particular third party application that are identified by the server and instead requires the client device to provide login credentials; and
  providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device.

20. The system of claim 19, wherein
providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device, comprises:
  in response to determining that the particular third party application does not permit the server to provide the login credentials for the particular third party application that are identified by the server and instead requires the client device to provide login credentials that are identified by the server, providing to the client device a client login script that includes the login credentials for the particular third party application, wherein receipt of the client login script by the client device causes the client device to execute the client login script and establish the authenticated session with the particular third party application without further input from the particular user after the request to access a particular third party application is obtained by the server.

21. The system of claim 19, wherein providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device, comprises:
  in response to determining that the particular third party application permits the server to provide the login credentials for the particular third party application that are identified by the server and does not require the client device to provide login credentials that are identified by the server:
    loading a login form of the particular third party application in a virtual web browser;
    supplying the login credentials for the particular third party application into the login form loaded by the virtual web browser;

submitting, by the virtual web browser, the login form of the particular third party application with the login credentials for the particular third party application supplied in the login form; and in response to submitting the login form of the particular third party application with login credentials for the particular third party application supplied in the login form, obtaining session information for an authenticated session between the virtual web browser and the particular third party application; and providing the session information for the authenticated session between the virtual web browser and the third party application to the client device for the client device to use to establish the authenticated session with the particular third party application.

22. The system of claim 21, wherein the session information comprises a web browser cookie.

23. The system of claim 21, the operations comprising:
determining whether the third party application requires login through a specific application programming interface,
wherein loading the login form of the particular third party application in the virtual web browser is in response to determining that the third party application does not require login through a specific application programming interface.

24. The system of claim 19, the operations comprising:
in response to obtaining, at the server of the sign-on system and from the client device, the request to access the particular third party application, determining whether a user is signed on the client device; and
in response to determining that a user is not signed on the client device, triggering the client device to provide a prompt for a user to provide login credentials for the sign-on system.

25. A non-transitory computer-readable medium storing software comprising instructions executable by one or more computers which, upon such execution, cause the one or more computers to perform operations comprising:
obtaining, at a server of a sign-on system and from a client device, login credentials of a particular user for the sign-on system;
obtaining, at the server of the sign-on system and from the client device, a request to access a particular third party application;
identifying, by the server of the sign-on system, login credentials for the particular third party application from among a set of multiple stored login credentials based at least on both the login credentials of the particular user obtained for the sign-on system and the particular third party application that was requested; and
triggering the client device to establish an authenticated session with the particular third party application requested using the login credentials for the particular third party application without providing the particular user access to the login credentials for the particular third party application, wherein the triggering includes:
determining whether the particular third party application does not permit the server to provide the login credentials for the particular third party application that are identified by the server and instead requires the client device to provide login credentials; and
providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device.

26. The medium of claim 25, wherein
providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device, comprises:
in response to determining that the particular third party application does not permit the server to provide the login credentials for the particular third party application that are identified by the server and instead requires the client device to provide login credentials that are identified by the server, providing to the client device a client login script that includes the login credentials for the particular third party application, wherein receipt of the client login script by the client device causes the client device to execute the client login script and establish the authenticated session with the particular third party application without further input from the particular user after the request to access a particular third party application is obtained by the server.

27. The medium of claim 25, wherein providing, to the client device and based at least on the determination whether the particular third party application does not permit the server to provide the login credentials for the particular third party application that are identified by the server and instead requires the client device to provide login credentials, at least one of (i) a client login script including the login credentials for the particular third party application or (ii) session information of an authenticated session between a virtual web browser instantiated by the server and the third party application for the client device, comprises:
in response to determining that the particular third party application permits the server to provide the login credentials for the particular third party application that are identified by the server and does not require the client device to provide login credentials that are identified by the server:
loading a login form of the particular third party application in a virtual web browser;
supplying the login credentials for the particular third party application into the login form loaded by the virtual web browser;
submitting, by the virtual web browser, the login form of the particular third party application with the login credentials for the particular third party application supplied in the login form; and
in response to submitting the login form of the particular third party application with login credentials for the particular third party application supplied in the login form, obtaining session information for an authenticated session between the virtual web browser and the particular third party application; and providing the session information for the authenticated session between the virtual web browser and the third party application to the client device for the client device to use to establish the authenticated session with the particular third party application.

28. The medium of claim 27, wherein the session information comprises a web browser cookie.

29. The medium of claim 27, the operations comprising:
determining whether the third party application requires login through a specific application programming interface,
wherein loading the login form of the particular third party application in the virtual web browser is in response to determining that the third party application does not require login through a specific application programming interface.

30. The medium of claim 25, the operations comprising:
in response to obtaining, at the server of the sign-on system and from the client device, the request to access the particular third party application, determining whether a user is signed on the client device; and
in response to determining that a user is not signed on the client device, triggering the client device to provide a prompt for a user to provide login credentials for the sign-on system.

* * * * *